Jan. 24, 1967   G. D. BOYD ET AL   3,300,653
PHASE-MATCHED RAMAN RADIATION AMPLIFIER AND OSCILLATOR
Filed May 19, 1965

INVENTORS  G. D. BOYD
S. P. S. PORTO
BY
Wilford L. Wisner
ATTORNEY

United States Patent Office 3,300,653
Patented Jan. 24, 1967

3,300,653
PHASE-MATCHED RAMAN RADIATION
AMPLIFIER AND OSCILLATOR
Gary D. Boyd, Murray Hill, and Sergio P. S. Porto, North Plainfield, N.J., assignors to Bell Telephone Laboratories, Incorporated, New York, N.Y., a corporation of New York
Filed May 19, 1965, Ser. No. 457,090
11 Claims. (Cl. 307—88.3)

This invention relates to the generation and amplification of electromagnetic waves having wavelengths comparable to or smaller than the dimensions of the amplifying device.

It will be convenient hereinafter to discuss the invention with particular reference to electromagnetic waves of light frequencies, but it is to be understood that the principles similarly are applicable to longer wavelengths, such as wavelengths in the microwave range.

Recently, second harmonic generation and parametric amplification in nonlinear optical materials have produced great interest and much intensive research. The reason for this interest and research resides in the broadband characteristics of parametric devices relative to the narrow band characteristics of most laser devices.

While lasers have opened the optical portion of the spectrum to techniques of information transmission via coherent radiation and have provided power levels that are apparently adequate for the proposed uses, it is desirable to associate the lasers with modulating and amplifying apparatus of greater bandwidth in order to utilize fully the potentially great rates of information transmission available at such high frequencies.

Two main types of nonlinear optical devices have emerged. The first type involves noncentrosymmetric crystals, in which optical electric field intensities induce polarization waves having a substantial component that is proportional to the square of an electric field intensity or to the product of intensities of two different-frequency optical electric fields. Development of this type of device has progressed until a variety of usable techniques are now available. For example, traveling wave parametric amplification can be provided as disclosed in the copending application of J. A. Giordmaine et al, Serial No. 158,267, filed December 11, 1961, now Patent No. 3,234,475 issued February 8, 1966, and assigned to the assignee hereof.

The other type of nonlinear optical device involves radiation-active crystals in which many lines of frequency-shifted radiation can be obtained in response to incident radiations. In particular, Raman-active crystals, i.e., those capable of producing Raman radiation, have been widely investigated. Raman radiation is a radiation produced in response to incident radiation by a change in the rotational or vibrational energy of scattering molecules. Radiations having frequencies lower than the frequency of incident radiation are called Stokes lines and those having higher frequencies are called anti-Stokes lines.

It has been desired to obtain a traveling wave interaction between the incident radiation and the produced Raman radiations. Traveling wave transfer of energy from the incident radiation to the produced radiations requires an appropriate phase relationship between the radiations at every point. Such an appropriate relationship is referred to in the art as phase-matching. It has heretofore been possible to obtain the phase-matching necessary for a traveling wave interaction only when the incident radiation and the Raman radiation are propagating in different directions. A discussion of such phase-matching conditions may be found, for example, in the article by E. Garmire et al., "Coherently Driven Molecular Vibrations and Light Modulation," Physical Review Letters 11:160, August 15, 1963.

Such techniques are not as efficient as is desired, since two light beams that are not propagating colinearly must cross within a volume that is limited by the narrowness of the beams. The effective nonlinear interaction is limited to this volume. Further, broadening the beams is not desirable because the beam intensity at every point in the interaction volume is reduced.

It is therefore an object of this invention to achieve traveling wave Raman-active interaction between colinearly propagating light beams.

Accordingly, our invention resides in the discovery that the little-investigated lines of Raman radiation that are polarized orthogonal to the pumping radiation are sufficiently strong to provide a traveling wave interaction colinearly phase-matched with the pumping radiation for certain orientations of the crystal with respect to the incident radiation.

This traveling wave interaction can provide oscillations in Raman-active material at a greatly reduced pumping power threshold and can also be greatly strengthened by a single pair of reflectors which provide multiple reflections of portions of both the pumping radiation and the Raman radiation for more efficient use of the Raman-active material. It is particularly noteworthy that the threshold reduction will permit pumping with a continuous-wave gas laser as opposed to the Q-switched ruby lasers previously employed to obtain useful Raman radiation.

Another aspect of our invention resides in parametric signal amplification utilizing Raman radiation.

A more complete understanding of our invention may be obtained from the following detailed description in conjunction with the drawing, in which.

Figure 3:
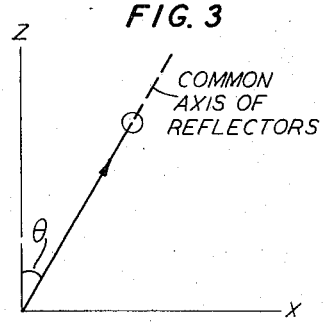
Figure 4:
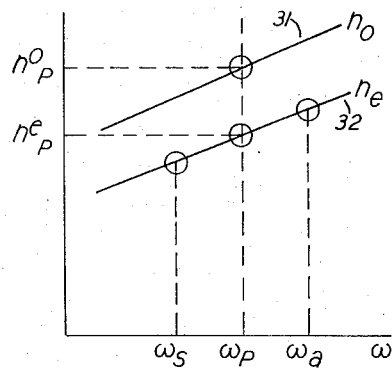
Figure 5:
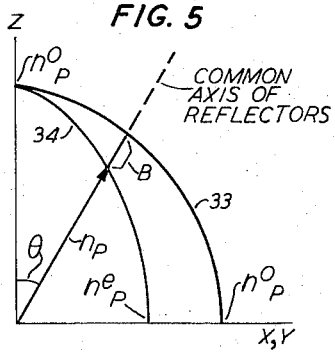
Figure 6:
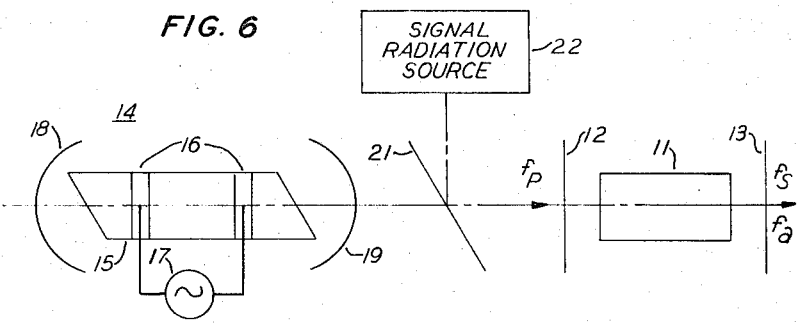

FIGS. 3, 4, and 5 show curves that are helpful in understanding the theory and operation of the invention; and FIG. 6 is a partially pictorial and partially block diagrammatic showing of a preferred embodiment of the invention providing parametric signal amplification.

The following background information concerning Raman radiation will help to provide an understanding both of the prior art and of the invention.

When spontaneous Stokes or anti-Stokes radiation is produced in a Raman-active material by a pumping radiation, there is essentially no phase matching; and the spontaneous radiation will not show a sharp intensity peak at any angle with respect to the direction of the pumping radiation. The reason for this characteristic is that spontaneous Stokes or anti-Stokes radiation is a three quanta process involving pumping radiation, Raman radiation and an optical phonon, i.e., a lattice vibration, that is not directional because of the dispersiveness of the material for optical phonons. Phase-matching cannot produce a highly directional Raman radiation because the lattice vibrations are not highly directional.

However, stimulated four quanta Raman processes are known which are highly directional and which permit vector phase-matching with the pumping radiation and Stokes and anti-Stokes radiation all propagating in different directions as disclosed in the above-cited article by Garmire et al. Such four quanta processes can be observed in both isotropic and birefringent Raman-active materials. We have recognized that the strength of such four quanta processes could be greatly increased and the threshold reduced if colinear phase-matching conditions were provided.

The strongest Raman radiations or lines observed, for example, in potassium dihydrogen phosphate (KDP), are polarized parallel to the polarization of the pumping radiation. We have discovered that, for a particular orientation of the crystal with respect to the pumping beam, an apparently weak Raman line polarized orthogonally to the pumping radiation has an unexpectedly high intensity in the same direction as the pumping radiation.

An enhanced interaction will result if the Raman active medium is placed within a common resonator for the Stokes, anti-Stokes and pump radiation. It can be appreciated that the colinear propogation of the pumping and amplified Raman radiations greatly simplifies the resonator apparatus.

Figure 1:
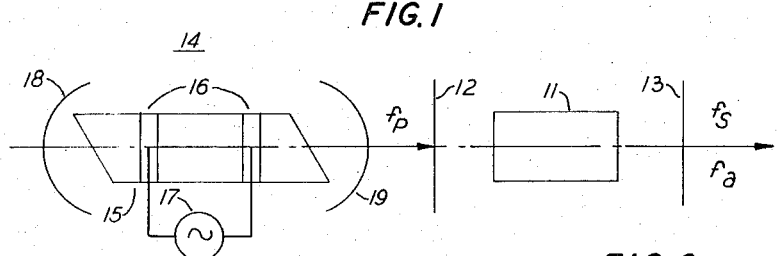
FIG. 1 is a partially pictorial and partially block diagrammatic showing of a preferred embodiment of the invention.

A preferred embodiment of the invention comprising a parametrical oscillator using a common resonator is shown in FIG. 1.

In FIG. 1, a crystal 11 of potassium dihydrogen phosphate (KDP) is disposed between two partially transmissive parallel-plane reflectors 12 and 13, which are aligned along a common axis as indicated. Crystal 11 is oriented with its optic axis at a prescribed angle, derived hereinafter, with respect to the common axis of reflectors 12 and 13. The plane of these two axes is oriented as described hereinafter in either of two ways with respect to the crystalline axes of crystal 11, depending upon which of the $B_1$ or $B_2$ Raman lines in KDP one wishes to use. The terms "$B_1$" and "$B_2$" refer to tensor coefficients that describe certain families among the Raman lines that are polarized orthogonally to the pumping radiation. The $B_1$ and $B_2$ lines appear to be the most promising for purposes of the invention.

The pumping beam for crystal 11 is derived from a laser 14, which typically comprises a tube 15 having Brewster-angle end windows and containing a helium-neon active gas mixture which is excited through electrodes 16 by either a radio-frequency or D.C. voltage source 17. Near confocal reflectors 18 and 19 of laser 14 are disposed along the axis of tube 15 beyond its end windows to form a resonator. The axis of tube 15 is aligned with the common axis of reflectors 12 and 13. Reflector 19 is partially transparent to transmit a portion of the laser output beam toward crystal 11.

Crystal 11 could also be any other Raman-active crystal, such as calcite, quartz, cadmium sulfide or zinc oxide, in which birefringence is present or can be induced. Zinc oxide appears particularly promising. Reflectors 12 and 13, shown planar, could be replaced with confocal or near confocal reflectors or any other type known in the art. They should have a reflectivity sufficient to raise the traveling wave gain above the oscillation threshold and are preferably fairly broad band.

The orientation of crystal 11 may be more specifically described as follows, similar principles being applicable regardless of the type of Raman-active material in crystal 11. For purposes of illustration, it will be assumed that one of the $B_2$ lines in KDP is used. In particular, let us use the appropriate, orthgonally polarized line having the Stokes shift in frequency of 156 cm.$^{-1}$ (wave numbers). For the production of this $B_2$ line, the plane defined by the optic axis (the Z axis) of crystal 11 and the common axis of reflectors 12 and 13 includes either the X or the Y crystalline axes of crystal 11; and the angle between the optic axis and the common axis of reflectors 12 and 13 will be about 0.37 degree if laser 14 is a helium-neon laser producing a beam with a 0.6328$\mu$ wave-length. This angle will be more generally derived hereinafter.

Alternatively, if a corresponding $B_1$ Raman radiation line in KDP crystal 11 is to be used, crystal 11 is oriented so that the plane defined by the optic axis (the Z axis) of crystal 11 and the common axis of reflectors 12 and 13 makes an angle of 45 degrees with respect to the X and Y crystalline axes. The angle between the optic axis and the common axis of reflectors 12 and 13 will again be about 0.37 degree if laser 14 is a helium-neon laser producing radiation with a 0.6328$\mu$ wavelength and the Stokes shift in frequency is the same. Thus to switch from one type of B line of Raman radiation to the other type, the crystal 11 is rotated 45 degrees about the common axis of the reflectors; the angle between the common axis and the optic axis remains the same in this example because for convenience both $B_1$ and $B_2$ lines were assumed to involve the same frequency shift and because the birefringent KDP crystal 11 is uniaxial. The angle would change if crystal 11 were a biaxial birefringent crystal.

Laser 14 could be replaced with another laser or another coherent-light source such as a parametric oscillator operating at a wavelength to which crystal 11 is substantially transparent. In general, changing the frequency of the pumping radiation, in addition to changing the Stokes and anti-Stokes frequencies, also makes desirable a corresponding change in the angle between the optic axis of crystal 11 and the common axis of reflectors 12 and 13 to maintain colinear phase matching. Nevertheless, small changes of the pumping frequency, such as those obtainable from a frequency-modulated pumping source, may not require continuous reorientation of crystal 11 inasmuch as phase-matching according to the invention appears to have some angular tolerance.

In the operation of the illustrative preferred embodiment of FIG. 1, the pumping beam from laser 14 generates Stokes and anti-Stokes radiations, which together comprise a $B_2$ line of Raman radiation in crystal 11, in a traveling wave interaction, the traveling wave gain being above the oscillation threshold. The sum of the Stokes and anti-Stokes frequencies equals twice the pumping frequency:

$$2\omega_p = \omega_s + \omega_a \qquad (1)$$

where $\omega_p$ is the pumping angular frequency, $\omega_s$ is the Stokes angular frequency, and $\omega_a$ is the anti-Stokes angular frequency. This relationship is obtained because the Raman process involved is a four quanta process; that is, one quantum of the desired frequency and one quantum of the idler frequency are created by two quanta of the pumping frequency. In other words, the generated frequencies occur together, the anti-Stokes radiation frequency being higher than the pumping frequency and the Stokes radiation frequency being lower than the pumping frequency. The intensities of the Stokes and anti-Stokes radiations will tend to follow the intensity of the pumping radiation. And, if the pumping frequency varies, the frequency shift remains the same, so that the Stokes and anti-Stokes frequencies tend to follow the pumping frequency.

By frequency-modulating the pumping radiation, for example, or by using a tunable parametric oscillator for source 14, the Stokes and anti-Stokes Raman radiations can be frequency-modulated. Thus, an arrangement according to the present invention would be useful as a frequency-modulation frequency converter. Of course, for a fixed orientation of crystal 11, a traveling wave interaction is attained only for a band of pumping frequencies sufficiently narrow to provide substantial phase matching in the common direction.

The principal advantages obtainable in the operation of an oscillator according to the invention are as follows: first, the interaction volume extends the entire length of crystal 11 for the colinearly propagating waves; second, a single pair of reflectors 12 and 13 form an effective resonator for all the interacting raditions; third, as a result of the preceding two effects, the oscillation threshold is greatly reduced; and fourth, continuous-wave excitation of Raman radiation is thus obtainable.

A more detailed explanation of the theory of the invention can be given as follows. A traveling wave interaction occurs between the pumping and Raman radiation beams as all these propagate colinearly with appropriate velocities in the direction of the common axis. The traveling wave gain for the Raman radiation is increased by reflections of portions of these beams by reflectors 12 and 13.

The frequency relationship was given above. To repeat:

$$2\omega_p = \omega_s + \omega_a \tag{1}$$

where $p$, $s$ and $a$ stand for pump, Stokes and anti-Stokes, respectively.

Figure 2:
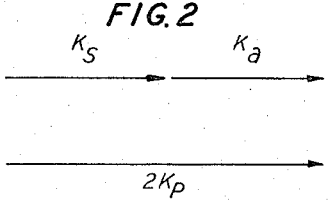
FIG. 2 is a vector diagram illustrating the colinear phase-matching condition of the embodiment of FIG. 1.

Since the beams are all propogating in the same direction, their propagation vectors may be represented as shown in FIG. 2. Inasmuch as $$2\vec{k}_p = \vec{k}_s + \vec{k}_a \tag{2}$$

as shown in FIG. 2, a phase-matched condition is illustrated.

The system parameters producing this phase-matched condition may be derived as follows: Equation 2 may be rewritten $$2\omega_p n_p = \omega_s n_s + \omega_a n_a \tag{3}$$

where $\omega$ is the angular frequency of the respective radiation and $n$ is the index of refraction of the material for the particular radiation, considering both frequency and polarization.

The indices of refraction may be expressed as functions of frequency. Referring to FIG. 4, one sees that in the frequency range of interest, both the ordinary and extraordinary indices of refraction vary essentially linearly with frequency. Let $$n_a^e = n_p^e + \sigma D \tag{4}$$

$$n_s^e = n_p^e - \sigma D \tag{5}$$

$$n_p^o = n_p^e + B \tag{6}$$

where a superscript $e$ stands for an extraordinary index, and a superscript $o$ stands for an ordinary index, $$\sigma = \frac{\omega_p - \omega_s}{\omega_p}$$

$\omega_p - \omega_s$ is the frequency shift hereinbefore taken to be 156 cm.$^{-1}$, $D$ is $\omega_p$ times the rate of change of index with respect to frequency, and $B$ is the index separation of the two lines (a measure of birefringence).

Taking into account the fact both Raman radations are polarized perpendicular to the pump radiation, one can derived from Equations 2–5:

$$B = \sigma^2 D \tag{7}$$

which indicates the amount of birefringence required for colinear phase matching.

Now let $\theta$ be the angle between the optic axis of crystal 11 and the common axis of reflectors 12 and 13, as indicated in FIG. 3. The indices of refraction presented to orthogonally polarized waves at the pumping wavelength may be plotted in polar form as a function of $\theta$ as shown in FIG. 5. The index separation $B$ for a propagation direction along the common axis is indicated thereon. The index separation $B$ is substantially the same for all three frequencies, as assumed in the curves of FIG. 4.

The value of $\theta$ for phase matching may be obtained from the polar equation for the elliptical curve 34 in FIG. 5:

$$\frac{n_p^2 \cos^2 \theta}{(n_p^o)^2} + \frac{n_v^2 \sin^2 \theta}{(n_p^e)^2} = 1 \tag{8}$$

and from the relationship:

$$B = n_p^o - n_p \tag{8a}$$

as shown in FIG. 5. With appropriate substitutions from the foregoing equations, there is obtained:

$$\sin \theta \approx \sigma \sqrt{\frac{D}{B}} \tag{9}$$

This equation applies to both $B_1$ and $B_2$ types of Raman radiation, provided the plane of the angle $\theta$ is properly oriented with respect to the crystalline X and Y axes, as described hereinbefore, to obtain the desired Raman radiation.

In the KDP crystal 11 at a pumping wavelength of 0.6328$\mu$ provided by laser 14 for the selected ones of the types $B_2$ or $B_1$ Raman radiation, for instance, $$\omega_p - \omega_s = 156 \text{ cm.}^{-1}$$

$\sigma = 0.0099$, $B = 0.0406$, and $D = 0.0174$. Therefore, $\theta = 0.37$ degree.

It should be particularly noted that, as the pumping beam is incident at such a small angle with respect to the optic axis, the phase-matching condition is substantially satisfied for relatively small variations in $\theta$, since the birefringence is slowly varying at small angles.

For other less strongly birefringent crystals 11, $\theta$ will be larger; but phase matching can still be obtained. The foregoing analysis indicates that little birefringence is required. This fact may be intuitively appreciated by considering that, in the four quanta Raman process described hereinbefore, the pumping, Stokes and anti-Stokes frequencies can be relatively closely spaced, as compared to three-quanta processes. Therefore, the phase mismatch is relatively small.

Now it is known that weak birefringence can be induced in some normally isotropic Raman active materials by the application of a strong electric or magnetic field or by a lattice vibration (elastic or acoustic wave). That is, the field or vibration produces a crystalline anisotropy. Therefore, the present invention makes possible colinear traveling wave parametric amplification, with all its attendant advantages of simple resonators and apparatus, in some normally isotropic Raman-active materials.

It is therefore understood that the invention may be practiced in any Raman-active material in which birefringence is present or can be induced.

It should be understood that the applications of the invention are not limited to oscillators. For example, traveling wave parametric signal amplification can be produced through the stimulated Raman process, as shown in FIG. 6.

The embodiment of FIG. 6 involves the following modifications of the embodiment of FIG. 1.

A source 22 of signal radiation at the Stokes or anti-Stokes frequency and a partially transmissive reflector 21 are disposed to direct a signal beam into crystal 11 colinearly with the pumping beam from laser 14 and polarized orthogonally thereto. For this purpose, reflector 21 is disposed at an oblique angle between reflectors 19 and 12 and transmits a sufficient portion of the beam of laser 14 toward crystal 11 while reflecting a sufficient portion of the signal from source 22 toward crystal 11. Source 22 illustratively includes a laser or other source of a carrier beam and an electro-optic shutter for amplitude-modulating the carrier beam with an information signal. In a communication system, the information signal may be initially derived from human speech. In other major respects, the embodiment of FIG. 6 is like that of FIG. 1.

The reflectivity of reflectors 12 and 13 is reduced and their transmissivity is increased in order to reduce the traveling wave parametric gain below the oscillation threshold. Inasmuch as some spontaneous Stokes and anti-Stokes radiation is still obtained, an alternative way of describing this adaptation is that the traveling wave parametric gain is reduced until the intensities of the Stokes and anti-Stokes radiations are responsive to the intensity of the signal radiation from source 22.

While the unresponsive portions of the Stokes and anti-Stokes radiations may be regarded as noise, it is understood that the amplified signal radiation passing through reflector 13 will eventually be demodulated; and the effects of noise can be counteracted in any of the known ways.

It will be noted the intensities of both Stokes and anti-

Stokes radiations respond to the signal radiation if one of them does, because of the four-quanta nature of the process. Therefore, the apparatus of FIG. 6 can be used as a frequency-shifting amplifier.

In all cases it is understood that the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. Apparatus comprising a body of a crystalline material in which two differing frequency quanta of Raman radiation can be stimulated by two quanta of a single-frequency polarized pumping radiation, at least one of said differing frequency quanta being polarized orthogonally to said pumping radiation quanta, said body having a crystalline anisotropy, means for directing said pumping radiation toward said body in a direction that enables phase-matched propagation of said pumping radiation and said orthogonally polarized Raman radiation in said direction, and means for colinearly resonating said pumping radiation and both of said differing-frequency Raman radiations to provide a traveling wave interaction among all of said radiations.

2. A device according to claim 1 in which the body of material has X, Y and Z crystalline axes, the Z axis being the optic axis, said crystal being oriented with the Z axis and the common direction of the radiations forming an angle, $\theta$ substantially equal to $$\sin^{-1}\sigma\sqrt{\frac{D}{B}}$$

where $\sigma$ is the frequency difference of the orthogonally polarized pumping and Raman radiations divided by the frequency of the pumping radiation, B is the difference between the ordinary and extraordinary indices of refraction of the body at any one frequency within the frequency range of interest, and D is the pumping angular frequency times the rate of change of index of refraction with respect to angular frequency, the plane defined by said angle $\theta$ being disposed with respect to said X and Y axes to favor generation of a selected line of Raman radiation.

3. A device according to claim 2 in which the body of material is oriented approximately to dispose the plane defined by said angle $\theta$ to include one of said X and Y axes.

4. A device according to claim 2 in which the body of material is oriented approximately to dispose the plane defined by said angle $\theta$ at 45 degrees with respect to said X and Y axes.

5. A device according to claim 2 in which the body of material is a crystal of potassium dihydrogen phosphate (KDP).

6. A traveling wave oscillator comprising a body of a Raman-active crystalline material having a crystalline anisotropy, a source of coherent linearly polarized pumping radiation, means for directing said pumping radiation at said body in a plane with respect to the crystalline axes of said body that is appropriate for the generation of two quanta of stimulated Raman radiation that is polarized orthogonally to said pumping radiation, said two quanta being produced by two quanta of said pumping radiation, said body being disposed with its optic axis in said plane at an angle $\theta$ with respect to the propagation direction of said radiations, said angle $\theta$ being appropriate for a phase-matched traveling wave interaction between said pumping and Raman radiations, and common reflective means for resonating both said pumping and said Raman radiations to raise the traveling wave gain above the oscillation threshold for said Raman radiations.

7. An oscillator according to claim 6 in which the source of pumping radiation is a continuous-wave gas laser.

8. An oscillator according to claim 7 in which the body of material is a crystal of potassium dihydrogen phosphate and the gas laser includes a helium-neon active gas lasing at 0.6328$\mu$, the angle $\theta$ being approximately 0.37 degree.

9. A traveling wave amplifier comprising a body of a Raman-active crystalline material having a crystalline anisotropy, a source of coherent linearly polarized pumping radiation, a source of information-modulated signal radiation polarized orthogonally to said pumping radiation, means for directing said pumping and signal radiations substantially colinearly at said body in a plane with respect to the crystalline axes of said body that is appropriate for the generation of two quanta of stimulated Raman radiation that is polarized orthogonal to said pumping radiation, said two quanta being produced by two quanta of said pumping radiation, said body being disposed with its optic axis in said plane at an angle $\theta$ with respect to the propagation direction of said radiations, said angle $\theta$ being appropriate for a phase-matched traveling wave interaction between said pumping, signal and Raman radiations, and means for providing substantially colinear reflections of portions of the pumping, signal and Raman radiations to provide traveling wave gain adapted for amplification of said signal radiation.

10. An amplifier according to claim 9 in which the body of material is a crystal of potassium dihydrogen phosphate.

11. An amplifier according to claim 10 in which the source of pumping radiation is a continuous-wave helium-neon gas laser operating at 0.6328$\mu$, the angle $\theta$ being 0.37 degree.

References Cited by the Applicant

Physical Review Letters, vol. 11, August 15, 1963, by E. Garmire et al., page 160.

Journal de Chimee Physique, vol. 46, 1949, by J. Chapelle, page 30.

Bull, Jr. de Mineralogie et de Cristallographie, vol. 73, 1950, by J. Chapelle, page 511, page 550.

ROY LAKE, *Primary Examiner.*

D. R. HOSTETTER, *Assistant Examiner.*